United States Patent
Huang et al.

(10) Patent No.: US 7,741,790 B2
(45) Date of Patent: Jun. 22, 2010

(54) BACKLIGHT SYSTEM HAVING A LAMP CURRENT BALANCE AND FEEDBACK MECHANISM AND RELATED METHOD THEREOF

(75) Inventors: Yen-Chen Huang, Hsin-Chu (TW);
Chia-Hung Sun, Hsin-Chu (TW);
Huang-Ti Lin, Hsin-Chu (TW);
Yuan-Pin Cho, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 169 days.

(21) Appl. No.: 12/053,624

(22) Filed: Mar. 24, 2008

(65) Prior Publication Data
US 2009/0184656 A1    Jul. 23, 2009

(30) Foreign Application Priority Data
Jan. 21, 2008 (TW) .............................. 97102182 A

(51) Int. Cl.
*H05B 41/16* (2006.01)

(52) U.S. Cl. ...................... 315/282; 315/277; 315/274; 315/312; 315/291

(58) Field of Classification Search ......... 315/274–289, 315/291–326, 224, 225
See application file for complete search history.

(56) References Cited

U.S. PATENT DOCUMENTS

| 6,420,839 | B1 | 7/2002 | Chiang |
| 7,045,967 | B2 | 5/2006 | Chen |
| 7,057,359 | B2 | 6/2006 | Hung |
| 2005/0285548 | A1* | 12/2005 | Moyer et al. ................ 315/312 |
| 2006/0043909 | A1* | 3/2006 | Hwang et al. ............... 315/276 |
| 2006/0108947 | A1* | 5/2006 | Maeda et al. ............... 315/277 |
| 2007/0132400 | A1* | 6/2007 | Lee ............................ 315/274 |

\* cited by examiner

*Primary Examiner*—Tuyet Vo
(74) *Attorney, Agent, or Firm*—Winston Hsu

(57) ABSTRACT

A lamp current balance and feedback system and related method are disclosed for balancing the input and output currents of a lamp by making use of a lamp current balance and feedback mechanism. The operation of the lamp current balance and feedback mechanism includes coupling the input current of the lamp for generating a first balance current by a first transformer, coupling the output current of the lamp for generating a second balance current by a second transformer, coupling the first and second transformers for substantially equalizing the first and second balance currents, generating a feedback signal based on the first or second balance current by a feedback circuit, generating a pulse width modulation signal based on the feedback signal by a pulse width modulation signal generation circuit, and driving the input and output currents of the lamp based on the pulse width modulation signal by a driving circuit.

10 Claims, 10 Drawing Sheets

BACKLIGHT SYSTEM HAVING A LAMP CURRENT BALANCE AND FEEDBACK MECHANISM AND RELATED METHOD THEREOF

BACKGROUND OF THE INVENTION

1. Field of the Invention

The present invention relates to a backlight system and related method, and more particularly, to a backlight system and related method based on a lamp current balance and feedback mechanism.

2. Description of the Prior Art

Because liquid crystal display (LCD) devices are characterized by thin appearance, low power consumption, and low radiation, LCD devices have been widely applied in various electronic products such as computer monitors, mobile phones, personal digital assistants (PDAs), or flat panel televisions. In general, the LCD device comprises liquid crystal layers encapsulated by two substrates and a backlight system for providing a light source. The operation of an LCD device is featured by varying voltage drops between opposite sides of the liquid crystal layers for twisting the angles of the liquid crystal molecules of the liquid crystal layers so that the transparency of the liquid crystal layers can be controlled for illustrating images with the aid of the backlight system.

The backlight system of an LCD device is normally disposed at the lower or lateral sides of the LCD panel of the LCD device. The backlight system in conjunction with various optical devices (such as diffusers and prisms) is able to provide a high-intensity and uniform light source for the LCD panel. That is, based on the voltage drops between opposite sides of the liquid crystal layers of the LCD panel with the aid of the uniform light source, the luminance and chromaticity of panel pixels can be controlled precisely so that the LCD device is capable of displaying high-quality images.

Please refer to FIG. 1, which is a structural diagram schematically showing a prior-art backlight system. As shown in FIG. 1, the backlight system 100 comprises a driving circuit 160, a transformer 120, a capacitor 180, and a lamp 140. The lamp 140 of the backlight system 100 is driven based on single-side driving mode. The transformer 120 comprises a first winding (primary winding) 121 and a second winding (secondary winding) 122. The driving circuit 160 is utilized to provide an AC driving voltage to the first winding 121 of the transformer 120. The second winding 122 of the transformer 120 in conjunction with the capacitor 180 performs a resonant operation for generating an AC voltage Vx having a high peak-to-peak voltage. The AC voltage Vx is then utilized to drive the lamp 140 for lighting. It is well-known that the length of the lamp 140 is increased with the panel size of liquid crystal display devices, and the peak-to-peak voltage of the AC voltage Vx should be also increased for driving the lamp 140 having greater length. Consequently, the current leakage of the lamp 140 becomes more serious resulting from the greater AC voltage Vx. Furthermore, the capacitor 180 and the transformer 120 are a costly high-voltage capacitor and a costly high-voltage transformer respectively for providing the greater AC voltage Vx. In view of the aforementioned shortcomings concerning the prior-art backlight system 100, it is obvious that backlight systems based on single-side driving mode cannot meet future demands for LCD devices having large panel size.

Please refer to FIG. 2, which is a structural diagram schematically showing another prior-art backlight system. As shown in FIG. 2, the backlight system 200 comprises a first driving circuit 260a, a second driving circuit 260b, a first transformer 220a, a second transformer 220b, a first capacitor 280a, a second capacitor 280b, and a lamp 240. The lamp 240 of backlight system 200 is driven based on double-side driving mode. The first driving circuit 260a is utilized to provide a first AC driving voltage to the first winding 221 of the first transformer 220a. The second driving circuit 260b is utilized to provide a second AC driving voltage to the first winding 223 of the second transformer 220b. The second winding 222 of the first transformer 220a in conjunction with the first capacitor 280a performs a resonant operation for generating a first AC voltage Va having a high peak-to-peak voltage. The second winding 224 of the second transformer 220b in conjunction with the second capacitor 280b performs a resonant operation for generating a second AC voltage Vb having a high peak-to-peak voltage. Therefore, both the first capacitor 280a and the second capacitor 280b should be costly high-voltage capacitors. The first AC voltage Va is furnished to the first end of the lamp 240. The second AC voltage Vb having opposite phase relative to the first AC voltage Va is furnished to the second end of the lamp 240. That is, the lamp 240 is driven based on the first AC voltage Va and the second AC voltage Vb having phase opposite to each other.

Due to production inaccuracy, aging or other factors, parameter discrepancy may occur to different elements, such as the capacitance deviation between the first capacitor 280a and the second capacitor 280b or the winding deviation between the first transformer 220a and the second transformer 220b, and therefore the currents furnished to the first and second ends of the lamp 240 may not have same current value. In addition, the current leakage of the lamp 240 is likely to occur under high-voltage operation because of parasitic capacitors corresponding to the lamp 240 regardless of the lamp 240 being a cold-cathode fluorescent lamp (CCFL) or an external electrode fluorescent lamp (EEFL). Consequently, the current inconsistency at the first and second ends of the lamp 240 is likely to occur in the operation of the backlight system 200. That is, the lamp 240 of the backlight system 200 is not able to generate uniform light output, and therefore display panels using the backlight system 200 cannot display images accurately.

SUMMARY OF THE INVENTION

In accordance with an embodiment of the present invention, a backlight system having a lamp current balance and feedback mechanism is provided. The backlight system comprises a lamp, a first transformer, and a second transformer. The lamp comprises a first end and a second end. The first transformer comprises a first winding and a second winding. The first end of the first winding of the first transformer is coupled to the first end of the lamp. The second transformer comprises a first winding and a second winding. The first end of the first winding of the second transformer is coupled to the second end of the lamp. The first end of the second winding of the second transformer is coupled to the first end of the second winding of the first transformer. The second end of the second winding of the second transformer is coupled to the second end of the second winding of the first transformer.

The present invention further provides a backlight system having a lamp current balance and feedback mechanism. The backlight system comprises a lamp, a first transformer, a second transformer, a capacitor, an inductor, and a driving circuit. The lamp comprises a first end and a second end. The first transformer comprises a first winding and a second winding. The first end of the second winding of the first transformer is coupled to the first end of the lamp. The second end of the second winding of the first transformer is coupled to a ground. The second transformer comprises a first winding and a second winding. The first end of the second winding of the second transformer is coupled to the second end of the lamp. The second end of the second winding of the second transformer is coupled to the ground. The first end of the first winding of the second transformer is coupled to the second end of the first winding of the first transformer. The second end of the first winding of the second transformer is coupled to the ground. The capacitor is coupled between the first end of the first winding of the first transformer and the ground. The inductor comprises a first end and a second end. The first end of the inductor is coupled to the first end of the first winding of the first transformer. The driving circuit is coupled between the second end of the inductor and the ground for generating a driving voltage. The driving voltage is provided between the second end of the inductor and the ground.

Furthermore, the present invention provides a lamp current balance and feedback method for balancing currents of the first lamp and the second lamp of a backlight system. The lamp current balance and feedback method comprises: sensing a first total current by summing a first balance current of the first end of the first lamp and a first balance current of the first end of the second lamp, and setting the first total current as a first end current; sensing a second total current by summing a second balance current of the second end of the first lamp and a second balance current of the second end of the second lamp, and setting the second total current as a second end current; and balancing the first end current and the second end current for substantially equalizing the first end current and the second end current.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers concerning the lamp current balance and feedback method are not meant thereto limit the operating sequence, and any rearrangement of the operating sequence for achieving same functionality is still within the spirit and scope of the invention.

Figure 3:
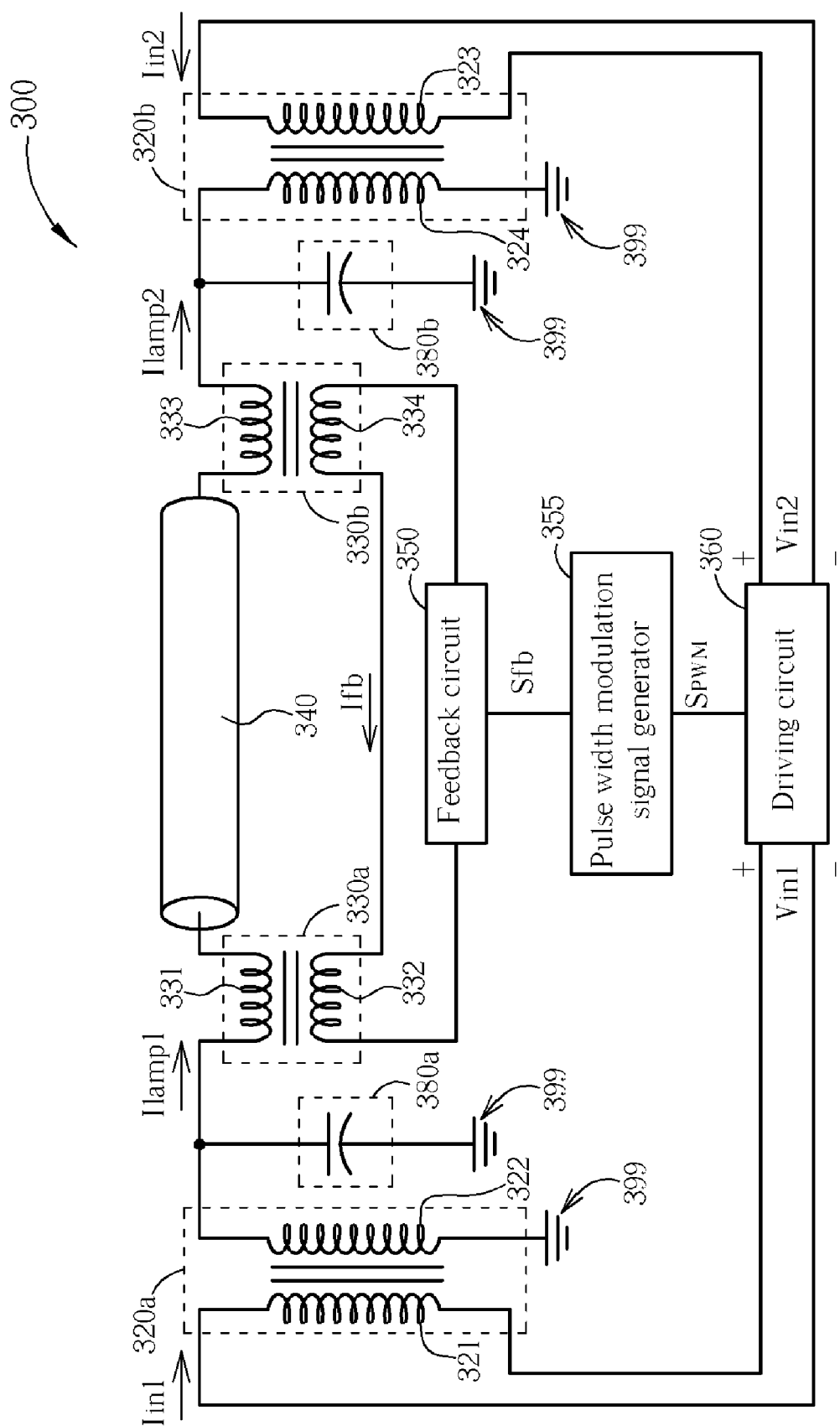
FIG. 3 is a structural diagram schematically showing a backlight system having a lamp current balance and feedback mechanism in accordance with a first embodiment of the present invention.

FIG. 3 is a structural diagram schematically showing a backlight system having a lamp current balance and feedback mechanism in accordance with a first embodiment of the present invention. As shown in FIG. 3, the backlight system 300 comprises a lamp 340, a first transformer 330a, a second transformer 330b, a first capacitor 380a, a second capacitor 380b, a third transformer 320a, a fourth transformer 320b, a feedback circuit 350, a pulse width modulation (PWM) signal generator 355, and a driving circuit 360.

The lamp 340 comprises a first end and a second end. The first transformer 330a comprises a first winding 331 and a second winding 332. The first end of the first winding 331 is coupled to the first end of the lamp 340. It is noted that the first winding of a transformer represents a primary winding, and the other windings of the transformer represent secondary windings throughout the description. The second transformer 330b comprises a first winding 333 and a second winding 334. The first end of the first winding 333 is coupled to the second end of the lamp 340. The first end of the second winding 334 is coupled to the first end of the second winding 332 for inducing a feedback current Ifb.

The third transformer 320a comprises a first winding 321 and a second winding 322. The first end of the second winding 322 is coupled to the second end of the first winding 331. The second end of the second winding 322 is coupled to a ground 399. The fourth transformer 320b comprises a first winding 323 and a second winding 324. The first end of the second winding 324 is coupled to the second end of the first winding 333. The second end of the second winding 324 is coupled to the ground 399. The first winding 321 of the third transformer 320a is coupled to the driving circuit 360. Also, the first winding 323 of the fourth transformer 320b is coupled to the driving circuit 360. The driving circuit 360 is utilized to generate a first driving voltage Vin1 and a second driving voltage Vin2. The first driving voltage Vin1 is furnished to the first winding 321 of the third transformer 320a. The second driving voltage Vin2 having opposite phase relative to the first driving voltage Vin1 is furnished to the first winding 323 of the fourth transformer 320b.

The first capacitor 380a is coupled between the first end of the second winding 322 and the ground 399. The second capacitor 380b is coupled between the first end of the second winding 324 and the ground 399. The feedback circuit 350 is coupled between the second end of the second winding 332 and the second end of the second winding 334. The feedback circuit 350 is utilized to sense the feedback current Ifb and generates a feedback signal Sfb based on the feedback current Ifb. The pulse width modulation signal generator 355 is coupled to the feedback circuit 350 for receiving the feedback signal Sfb and generates a PWM signal $S_{PWM}$ based on the feedback signal Sfb. The PWM signal $S_{PWM}$ is furnished to the driving circuit 360 so that the driving circuit 360 is able to generate the first driving voltage Vin1 and the second driving voltage Vin2 based on the PWM signal $S_{PWM}$.

In the operation of the backlight system 300, the first driving voltage Vin1 and the second driving voltage Vin2 are furnished to the first winding 321 of the third transformer 320a and the first winding 323 of the fourth transformer 320b respectively so as to generate a first input current Iin1 and a second input current Iin2. The second winding 322 of the third transformer 320a in conjunction with the first capacitor 380a performs a resonant operation for generating a first lamp current Ilamp1 based on the first input current Iin1. Similarly, the second winding 324 of the fourth transformer 320b in conjunction with the second capacitor 380b performs a resonant operation for generating a second lamp current Ilamp2 based on the second input current Iin2. The first lamp current Ilamp1 and the second lamp current Ilamp2 are balanced by the feedback current Ifb generated through coupling the second winding 332 of the first transformer 330a and the second winding 334 of the second transformer 330b. Accordingly, the first lamp current Ilamp1 is substantially equal to the second lamp current Ilamp2. That is, the feedback current Ifb is utilized for performing both feedback and balance operations. Besides, the pulse width modulation signal generator 355 is able to quit outputting the PWM signal $S_{PWM}$ to the driving circuit 360 or set the duty cycle of the PWM signal $S_{PWM}$ to zero while receiving an abnormal feedback signal Sfb for protecting the backlight system 300 from being damaged. The abnormal feedback signal Sfb may occur when the lamp 340 is broken.

Figure 4:
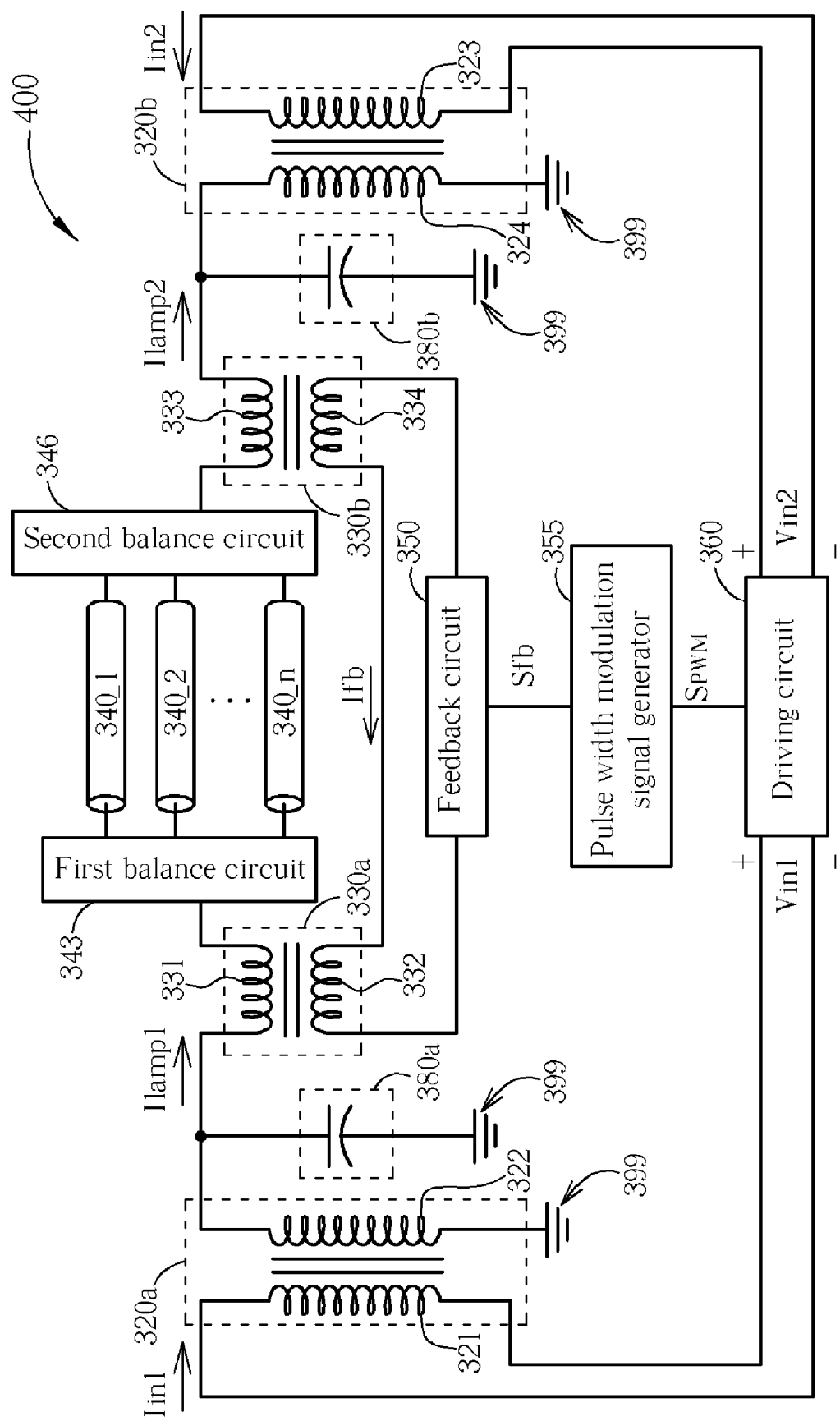
FIG. 4 is a structural diagram schematically showing a backlight system having a lamp current balance and feedback mechanism in accordance with a second embodiment of the present invention.

Please refer to FIG. 4, which is a structural diagram schematically showing a backlight system having a lamp current balance and feedback mechanism in accordance with a second embodiment of the present invention. The structure of the backlight system 400 is similar to the structure of the backlight system 300 shown in FIG. 3, differing only in that the lamp 340 is replaced with a plurality of lamps 340_1-340_n, and additionally there are a first balance circuit 343 and a second balance circuit 346 coupled to opposite sides of the plurality of lamps 340_1-340_n respectively in the backlight system 400. The first balance circuit 343 and the second balance circuit 346 are utilized to distribute the first lamp current Ilamp1 and the second lamp current Ilamp2 to the plurality of lamps 340_1-340_n so that the currents flowing through the plurality of lamps 340_1-340_n are equal to each other. When anyone of the plurality of lamps 340_1-340_n is broken, the pulse width modulation signal generator 355 is able to quit outputting the PWM signal $S_{PWM}$ to the driving circuit 360 or set the duty cycle of the PWM signal $S_{PWM}$ to zero based on an abnormal feedback signal Sfb for protecting the backlight system 400 from being damaged. The other structural arrangements of the backlight system 400 are identical to those of the backlight system 300 in FIG. 3, and for the sake of brevity, further description on the backlight system 400 is omitted.

Figure 5:
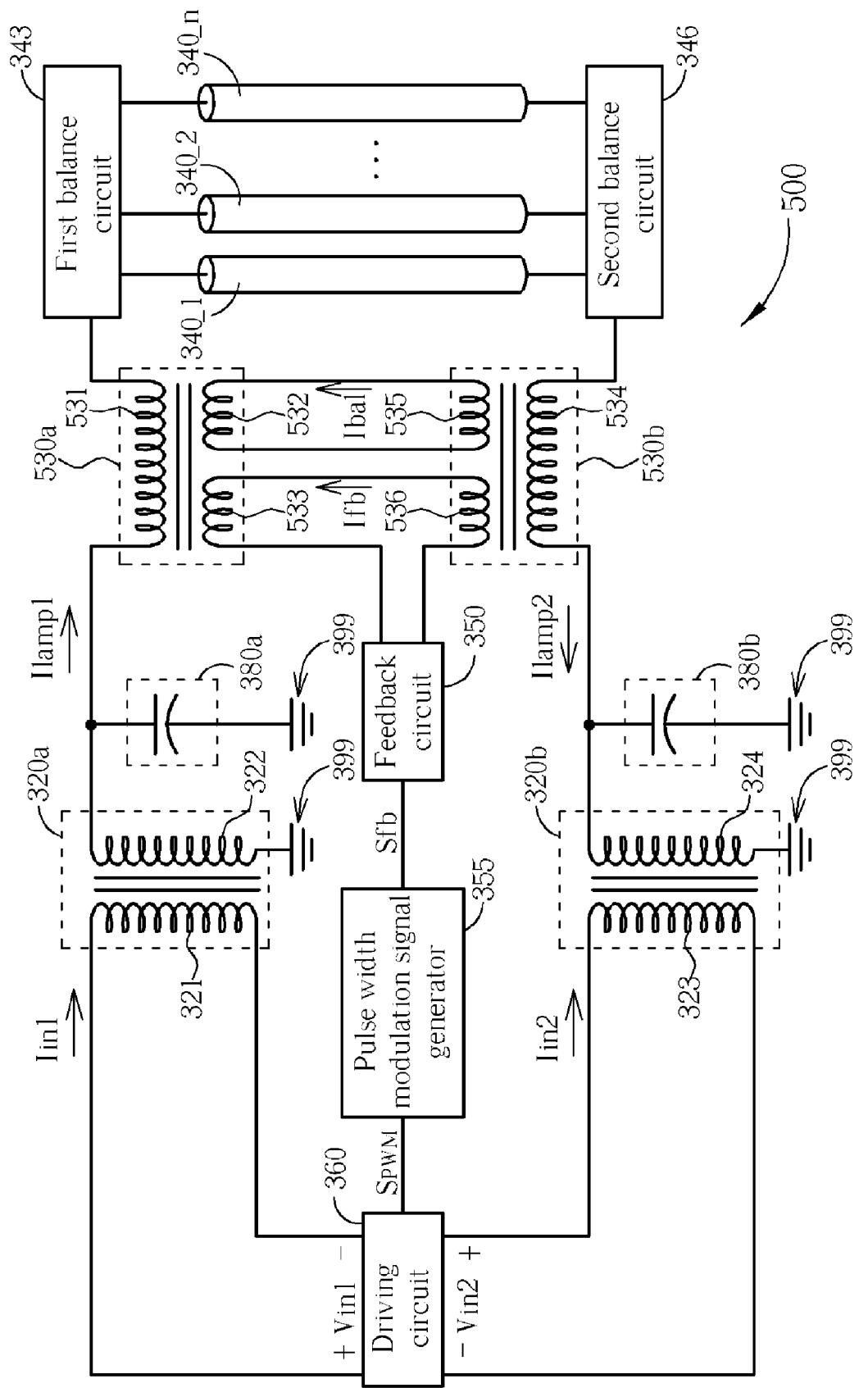
FIG. 5 is a structural diagram schematically showing a backlight system having a lamp current balance and feedback mechanism in accordance with a third embodiment of the present invention.

Please refer to FIG. 5, which is a structural diagram schematically showing a backlight system having a lamp current balance and feedback mechanism in accordance with a third embodiment of the present invention. The structure of the backlight system 500 is similar to the structure of the backlight system 400 shown in FIG. 4, differing only in that the first transformer 330a and the second transformer 330b are replaced with a first transformer 530a and a second transformer 530b respectively. The first transformer 530a comprises a first winding 531, a second winding 532, and a third winding 533. The first winding 531 is coupled between the first balance circuit 343 and the first end of the second winding 322 of the third transformer 320a. The second transformer 530b comprises a first winding 534, a second winding 535, and a third winding 536. The first winding 534 is coupled between the second balance circuit 346 and the first end of the second winding 324 of the fourth transformer 320b. The first and second ends of the second winding 535 are coupled directly to the first and second ends of the second winding 532 of the first transformer 530a. The second windings 532 and 535 are utilized to induce a balance current Ibal for performing a balance operation. The first end of the third winding 536 is coupled to the first end of the third winding 533 of the first transformer 530a for inducing a feedback current Ifb.

The feedback circuit 350 of the backlight system 500 is coupled between the second end of the third winding 533 and the second end of the third winding 536 for generating a feedback signal Sfb based on the feedback current Ifb. In the operation of the backlight system 500, the balance current Ibal is utilized to balance a first lamp current Ilamp1 and a second lamp current Ilamp2 so that the first lamp current Ilamp1 substantially equals the second lamp current Ilamp2. Furthermore, the first balance circuit 343 and the second balance circuit 346 of the backlight system 500 distribute the first lamp current Ilamp1 and the second lamp current Ilamp2 equally to opposite sides of each of the plurality of lamps 340_1-340_n of the backlight system 500. That is, the balance current Ibal is utilized only for performing a balance operation, and the feedback current Ifb is utilized primarily for performing a feedback operation and secondarily for performing an auxiliary balance operation. The other structural arrangements of the backlight system 500 are identical to those of the backlight system 400 in FIG. 4, and for the sake of brevity, further description on the backlight system 500 is omitted.

Figure 6:
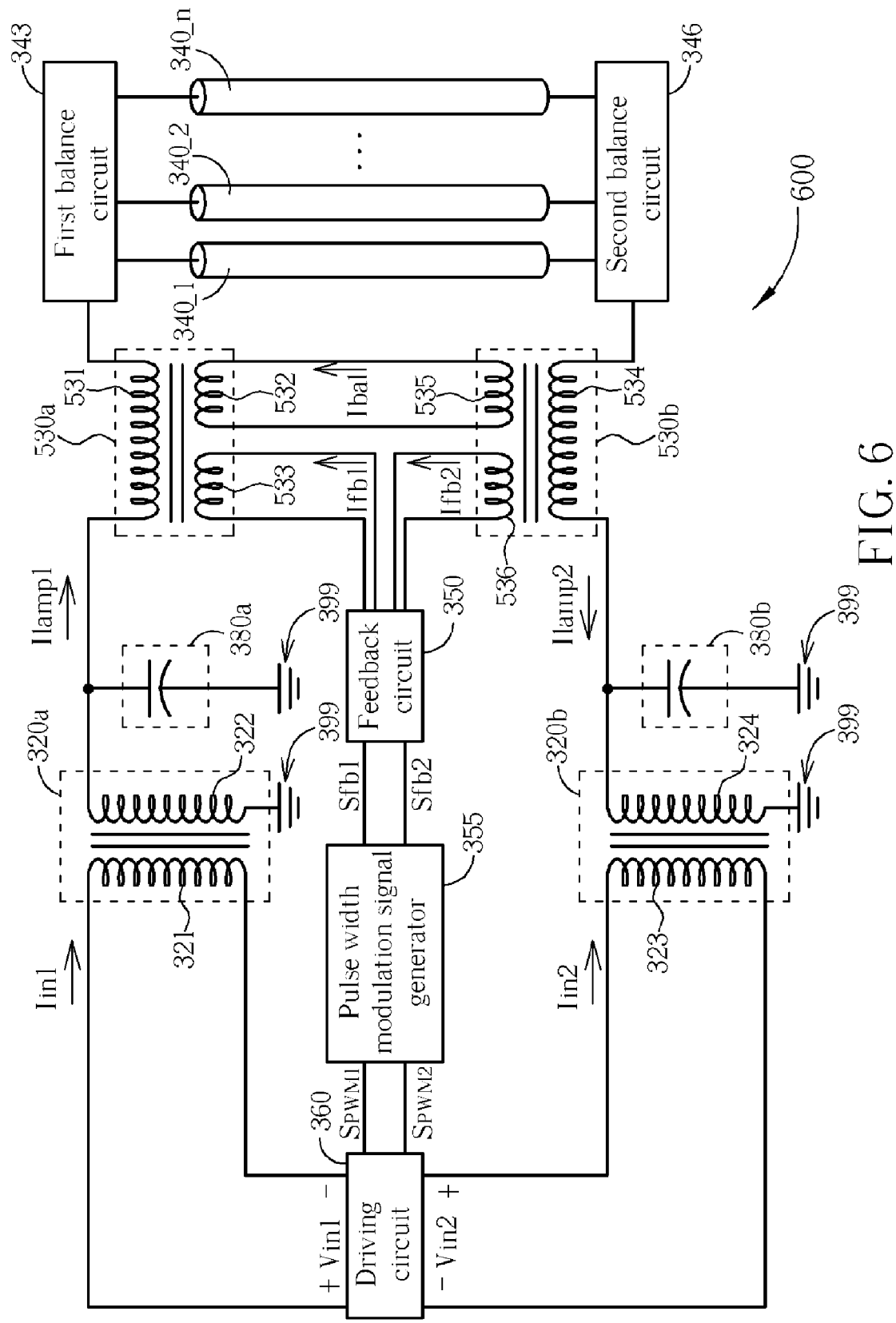
FIG. 6 is a structural diagram schematically showing a backlight system having a lamp current balance and feedback mechanism in accordance with a fourth embodiment of the present invention.

Please refer to FIG. 6, which is a structural diagram schematically showing a backlight system having a lamp current balance and feedback mechanism in accordance with a fourth embodiment of the present invention. The structure of the backlight system 600 is similar to the structure of the backlight system 500 shown in FIG. 5, differing only in that the first end of the third winding 533 of the backlight system 600 is coupled directly to the feedback circuit 350 for inducing a first feedback current Ifb1, and the first end of the third winding 536 of the backlight system 600 is coupled directly to the feedback circuit 350 for inducing a second feedback current Ifb2. That is, the first end of the third winding 533 of the first transformer 530a is not coupled directly to the first end of the third winding 536 of the second transformer 530b in the backlight system 600.

Accordingly, the feedback circuit 350 is capable of generating a first feedback signal Sfb1 and a second feedback signal Sfb2 based on the first feedback current Ifb1 and the second feedback current Ifb2 respectively. The pulse width modulation signal generator 355 is then able to generate a first PWM signal $S_{PWM1}$ and a second PWM signal $S_{PWM2}$ based on the first feedback signal Sfb1 and the second feedback signal Sfb2 respectively. Furthermore, the first PWM signal $S_{PWM1}$ and the second PWM signal $S_{PWM2}$ are utilized to generate the first driving voltage Vin1 and the second driving voltage Vin2 respectively by the driving circuit 360. The other structural arrangements of the backlight system 600 are identical to those of the backlight system 500 in FIG. 5, and for the sake of brevity, further description on the backlight system 600 is omitted.

Figure 7:
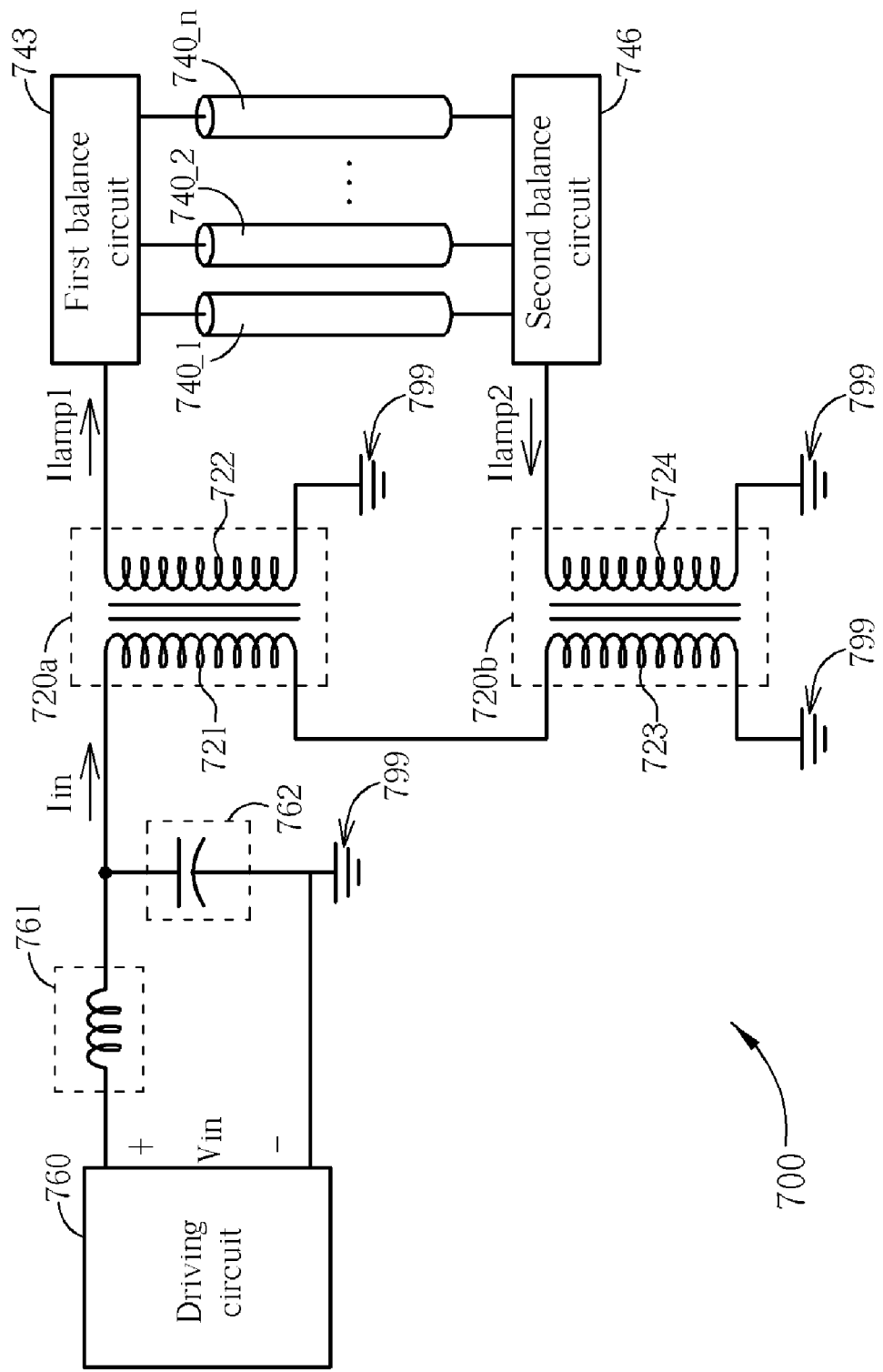
FIG. 7 is a structural diagram schematically showing a backlight system having a lamp current balance and feedback mechanism in accordance with a fifth embodiment of the present invention.

Please refer to FIG. 7, which is a structural diagram schematically showing a backlight system having a lamp current balance and feedback mechanism in accordance with a fifth embodiment of the present invention. As shown in FIG. 7, the backlight system 700 comprises a driving circuit 760, an inductor 761, a capacitor 762, a first transformer 720a, a second transformer 720b, a first balance circuit 743, a second balance circuit 746, and a plurality of lamps 740_1-740_n. The first balance circuit 743 and the second balance circuit 746 are coupled to opposite sides of the plurality of lamps 740_1-740_n respectively. The first transformer 720a comprises a first winding 721 and a second winding 722. The second winding 722 is coupled between the first balance circuit 743 and a ground 799 for inducing a first lamp current Ilamp1. The second transformer 720b comprises a first winding 723 and a second winding 724. The second winding 724 is coupled between the second balance circuit 746 and the ground 799 for inducing a second lamp current Ilamp2. The first and second ends of the first winding 723 are coupled to the second end of the first winding 721 and the ground 799. The inductor 761 is coupled between the driving circuit 760 and the first end of the first winding 721. The capacitor 762 is coupled between the first end of the first winding 721 and the ground 799.

Figure 1:
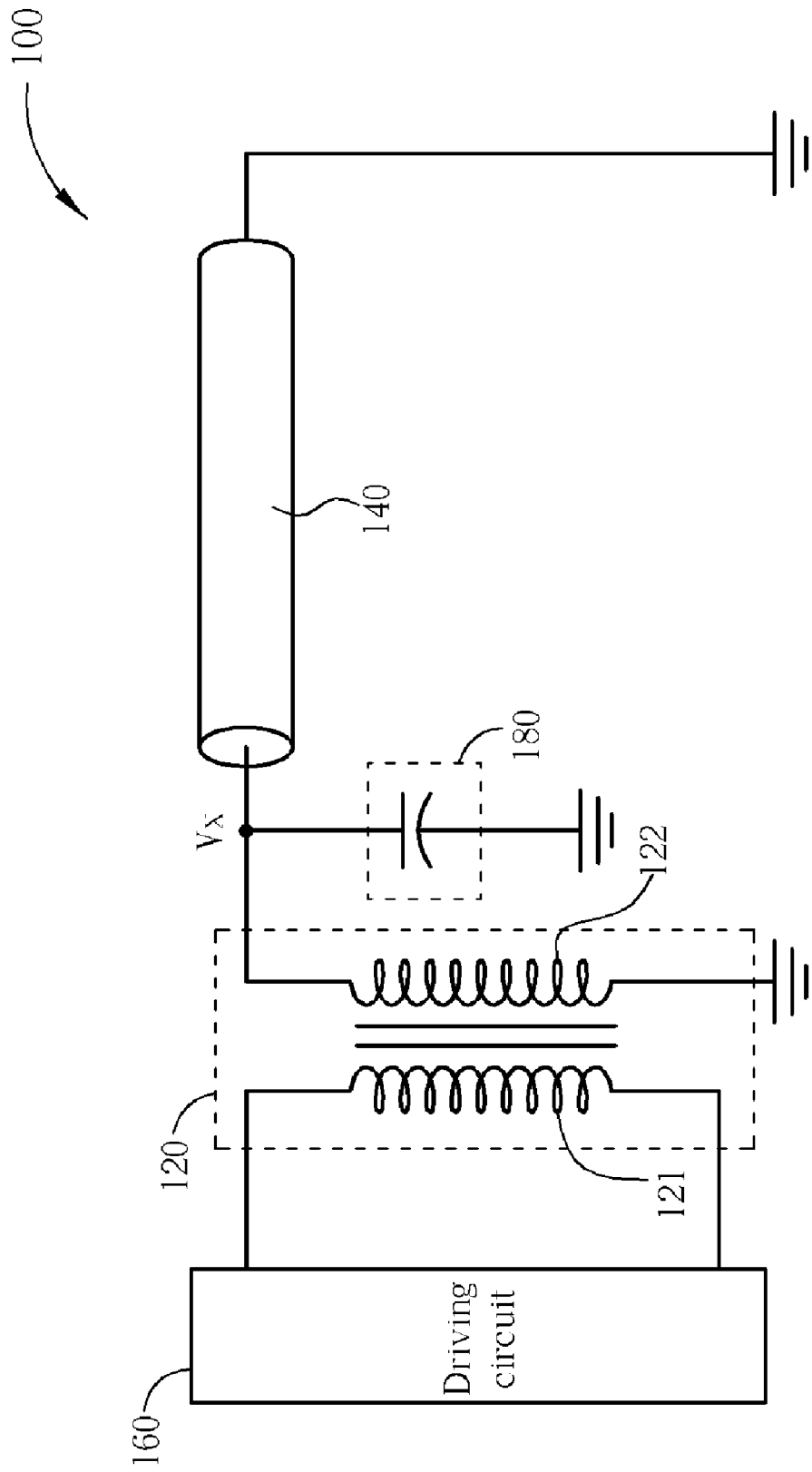
FIG. 1 is a structural diagram schematically showing a prior-art backlight system.
Figure 2:
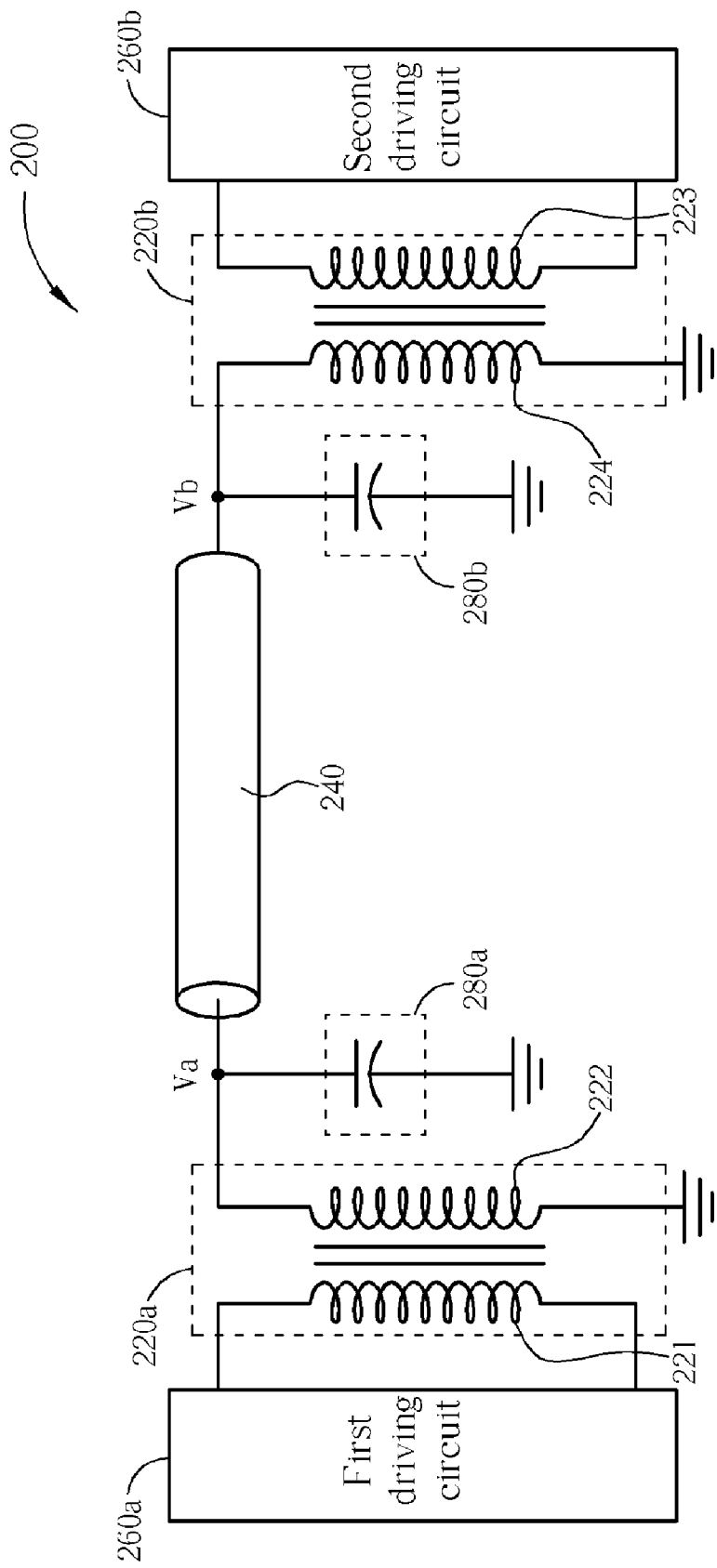
FIG. 2 is a structural diagram schematically showing another prior-art backlight system.

The driving circuit 760 is utilized to provide a driving voltage Vin. The inductor 761 in conjunction with the capacitor 762 performs a resonant operation for generating an input lamp current Iin based on the driving voltage Vin. The input lamp current Iin is furnished to the first winding 721 of the first transformer 720a and the first winding 723 of the second transformer 720b. Consequently, the first capacitor 280a and the second capacitor 280b shown in FIG. 2 are not required in the backlight system 700 for performing resonant operations. That is, the first capacitor 280a and the second capacitor 280b, which are expensive high-voltage capacitors, can be omitted for saving the cost of the backlight system 700. Furthermore, since the input current Iin is furnished to both the first windings 721 and 723, the input current Iin is able to function as a balance current for balancing the first lamp current Ilamp1 and the second lamp current Ilamp2.

Figure 8:
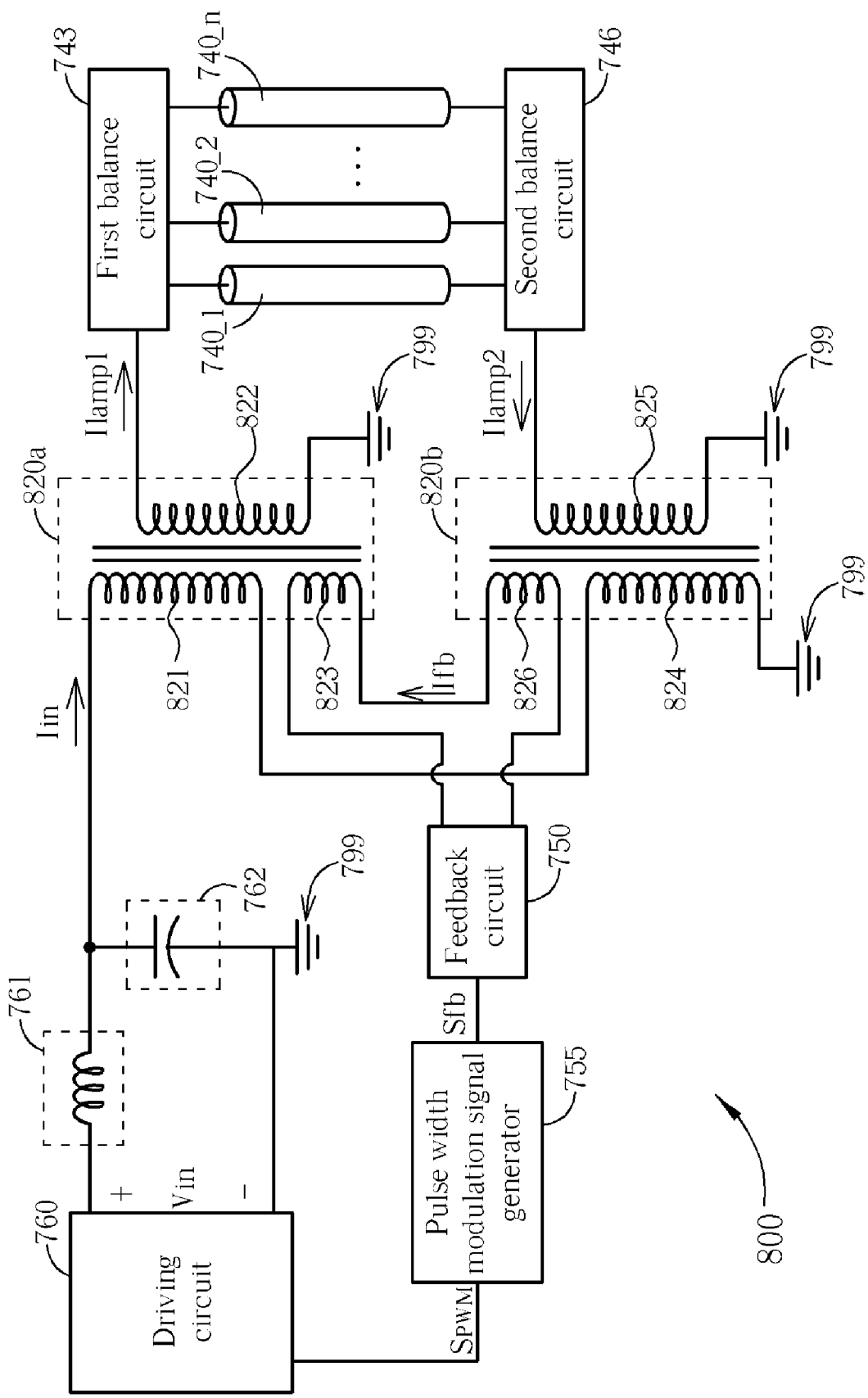
FIG. 8 is a structural diagram schematically showing a backlight system having a lamp current balance and feedback mechanism in accordance with a sixth embodiment of the present invention.

Please refer to FIG. 8, which is a structural diagram schematically showing a backlight system having a lamp current balance and feedback mechanism in accordance with a sixth embodiment of the present invention. The structure of the backlight system 800 is similar to the structure of the backlight system 700 shown in FIG. 7, differing only in that the first transformer 720a and the second transformer 720b are replaced with a first transformer 820a and a second transformer 820b respectively, and additionally there are a feedback circuit 750 and a pulse width modulation signal generator 755 coupled to the first transformer 820a and the second transformer 820b in the backlight system 800. The structural arrangements concerning other elements of the backlight system 800 are identical to those of the backlight system 700.

The first transformer 820a comprises a first winding 821, a second winding 822, and a third winding 823. The second winding 822 is coupled between the first balance circuit 743 and the ground 799 for inducing a first lamp current Ilamp1. The first end of the first winding 821 is coupled to the inductor 761. The second transformer 820b comprises a first winding 824, a second winding 825, and a third winding 826. The second winding 825 is coupled between the second balance circuit 746 and the ground 799 for inducing a second lamp current Ilamp2. The first and second ends of the first winding 824 are coupled to the second end of the first winding 821 and the ground 799. The first end of the third winding 826 is coupled to the first end of the third winding 823 of the first transformer 820a for inducing a feedback current Ifb.

The feedback circuit 750 is coupled between the second end of the third winding 823 and the second end of the third winding 826. The feedback circuit 750 is utilized to sense the feedback current Ifb and generates a feedback signal Sfb based on the feedback current Ifb. The pulse width modulation signal generator 755 is coupled to the feedback circuit 750 for receiving the feedback signal Sfb and generates a PWM signal $S_{PWM}$ based on the feedback signal Sfb. The PWM signal $S_{PWM}$ is furnished to the driving circuit 760 so that the driving circuit 760 is able to generate the driving voltage Vin based on the PWM signal $S_{PWM}$.

In the operation of the backlight system 800, the first lamp current Ilamp1 and the second lamp current Ilamp2 are balanced by the feedback current Ifb generated through coupling the third winding 823 of the first transformer 820a and the third winding 826 of the second transformer 820b. Consequently, the feedback current Ifb is utilized for performing both feedback and balance operations. As aforementioned, the input current Iin can also be utilized for performing an auxiliary balance operation. Furthermore, when anyone of the plurality of lamps 740_1-740_n is broken, the pulse width modulation signal generator 755 is able to quit outputting the PWM signal $S_{PWM}$ to the driving circuit 760 or set the duty cycle of the PWM signal $S_{PWM}$ to zero based on an abnormal feedback signal Sfb for protecting the backlight system 800 from being damaged.

Figure 9:
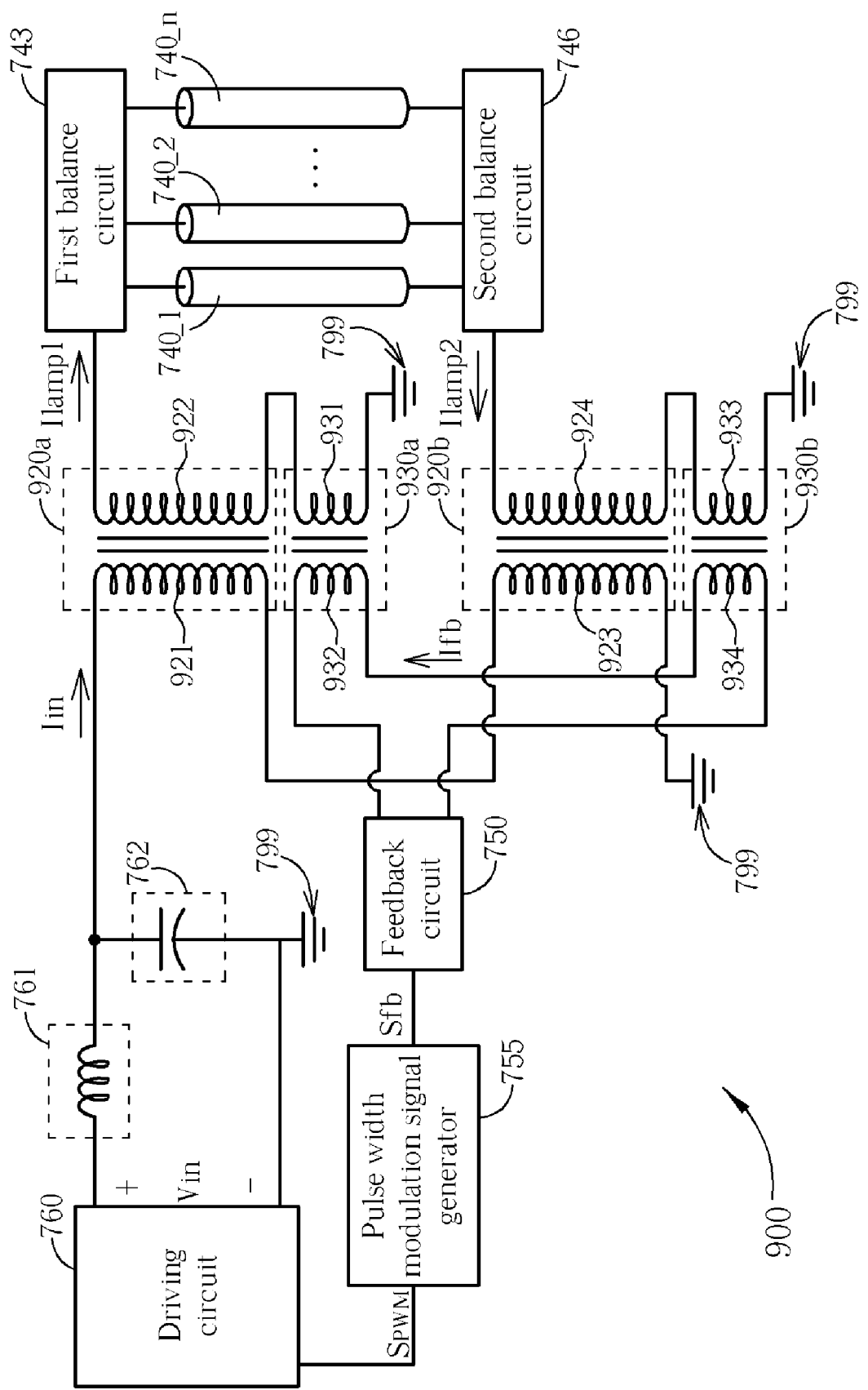
FIG. 9 is a structural diagram schematically showing a backlight system having a lamp current balance and feedback mechanism in accordance with a seventh embodiment of the present invention.

Please refer to FIG. 9, which is a structural diagram schematically showing a backlight system having a lamp current balance and feedback mechanism in accordance with a seventh embodiment of the present invention. The structure of the backlight system 900 is similar to the structure of the backlight system 800 shown in FIG. 8, differing only in that the first transformer 820a is replaced with a first transformer 920a and a third transformer 930a, and the second transformer 820b is replaced with a second transformer 920b and a fourth transformer 930b. The structural arrangements concerning other elements of the backlight system 900 are identical to those of the backlight system 800.

The first transformer 920a comprises a first winding 921 and a second winding 922. The first end of the first winding 921 is coupled to the inductor 761. The first end of the second winding 922 is coupled to the first balance circuit 743. The second transformer 920b comprises a first winding 923 and a second winding 924. The first and second ends of the first winding 923 are coupled to the second end of the first winding 921 and the ground 799 respectively. The first end of the second winding 924 is coupled to the second balance circuit 746. The third transformer 930a comprises a first winding 931 and a second winding 932. The first and second ends of the first winding 931 are coupled to the second end of the second winding 922 and the ground 799 respectively. The fourth transformer 930b comprises a first winding 933 and a second winding 934. The first and second ends of the first winding 933 are coupled to the second end of the second winding 924 and the ground 799 respectively. The first end of the second winding 934 is coupled to the first end of the second winding 932 for inducing a feedback current Ifb.

The feedback circuit 750 is coupled between the second end of the second winding 932 and the second end of the second winding 934. The feedback circuit 750 is utilized to sense the feedback current Ifb and generates a feedback signal Sfb based on the feedback current Ifb. Furthermore, the feedback current Ifb can be utilized to balance the first lamp current Ilamp1 and the second lamp current Ilamp2 through the coupling of the third transformer 930a and the fourth transformer 930b. That is, the feedback current Ifb is utilized for performing both feedback and balance operations. Moreover, as aforementioned, the input current Iin can also be utilized for performing an auxiliary balance operation. The other operations of the backlight system 900 are identical to the operations of the backlight system 800, and for the sake of brevity, further description on the backlight system 900 is omitted.

Figure 10:
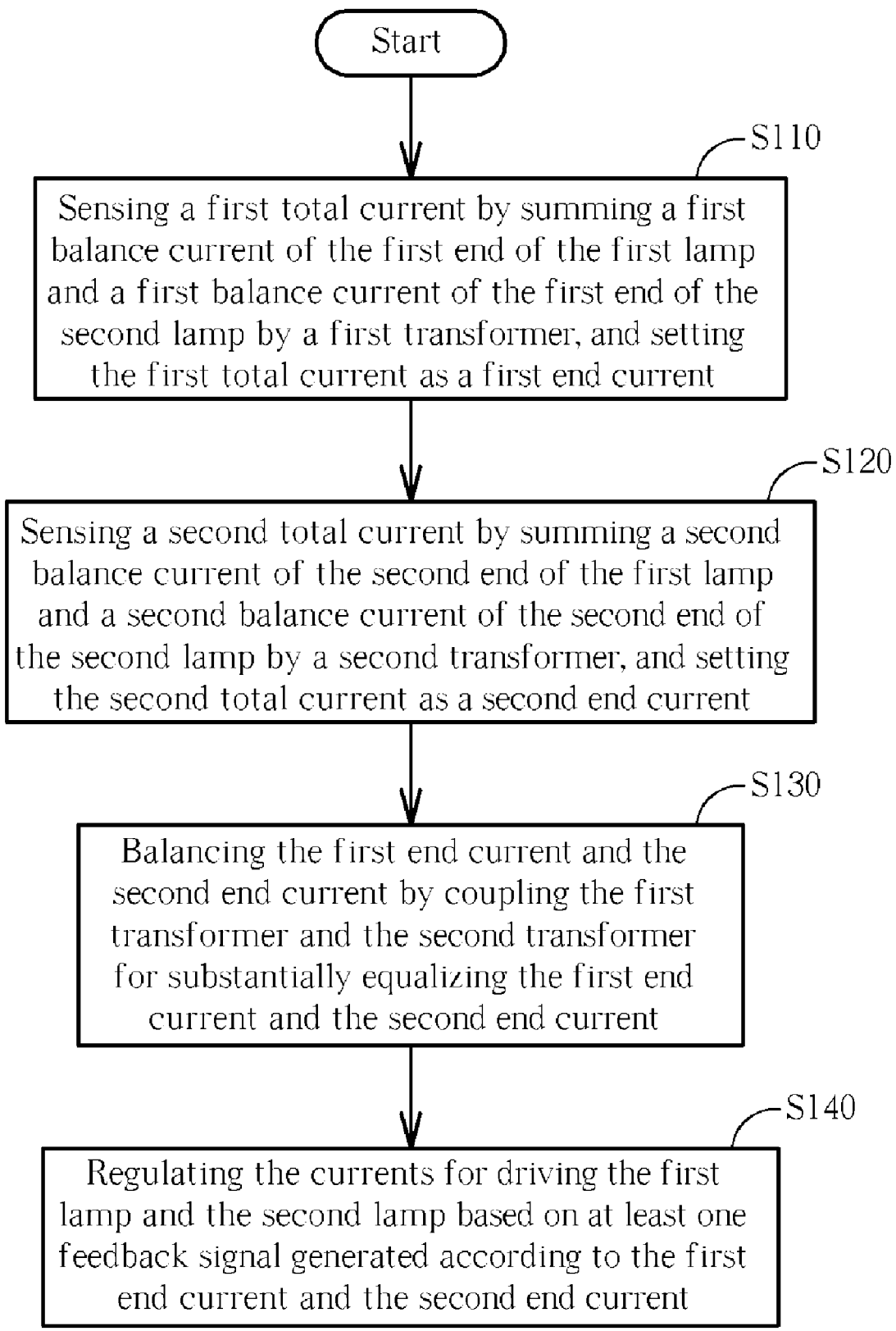
FIG. 10 presents a flowchart depicting a lamp current balance and feedback method of the present invention.

Please refer to FIG. 10, which presents a flowchart depicting a lamp current balance and feedback method of the present invention. The lamp current balance and feedback method is utilized to balance currents of the first and second lamps of a backlight system. The lamp current balance and feedback method comprises:

Step S110: sensing a first total current by summing a first balance current of the first end of the first lamp and a first balance current of the first end of the second lamp by a first transformer, and setting the first total current as a first end current;

Step S120: sensing a second total current by summing a second balance current of the second end of the first lamp and a second balance current of the second end of the second lamp by a second transformer, and setting the second total current as a second end current;

Step S130: balancing the first end current and the second end current by coupling the first transformer and the second transformer for substantially equalizing the first end current and the second end current; and Step S140: regulating the currents for driving the first lamp and the second lamp based on at least one feedback signal generated according to the first end current and the second end current.

In summary, the backlight system and related method of the present invention is able to drive all the lamps of the backlight system generating uniform light outputs by making use of feedback current or balance current induced through transformer coupling. Furthermore, the feedback mechanism of the present invention is able to quit driving operations for protecting the backlight system from being damaged when system malfunction occurs.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A backlight system comprising:
   a first lamp comprising a first end and a second end;
   a first transformer comprising a first winding and a second winding, a first end of the first winding of the first transformer being coupled to the first end of the first lamp;
   a second transformer comprising a first winding and a second winding, a first end of the first winding of the second transformer being coupled to the second end of the first lamp, a first end of the second winding of the second transformer being coupled to a first end of the second winding of the first transformer, a second end of the second winding of the second transformer being coupled to a second end of the second winding of the first transformer;
   a third transformer comprising a first winding and a second winding, a first end of the second winding of the third transformer being coupled to a second end of the first winding of the first transformer, a second end of the second winding of the third transformer being coupled to a ground;
   a fourth transformer comprising a first winding and a second winding, a first end of the second winding of the fourth transformer being coupled to a second end of the first winding of the second transformer, a second end of the second winding of the fourth transformer being coupled to the ground; and
   a driving circuit, coupled to the first winding of the third transformer and the first winding of the fourth transformer, for generating a first driving voltage and a second driving voltage having opposite phase with each other;
   wherein the first driving voltage is furnished to the first winding of the third transformer and the second driving voltage is furnished to the first winding of the fourth transformer.

2. The backlight system of claim 1, further comprising:
   a first capacitor coupled between the first end of the second winding of the third transformer and the ground; and
   a second capacitor coupled between the first end of the second winding of the fourth transformer and the ground.

3. The backlight system of claim 1, further comprising:
   a feedback circuit coupled between the second end of the second winding of the first transformer and the second end of the second winding of the second transformer for receiving a feedback current and generating a feedback signal based on the feedback current; and
   a pulse width modulation (PWM) signal generator coupled between the feedback circuit and the driving circuit for receiving the feedback signal and generating a PWM signal based on the feedback signal, the PWM signal being furnished to the driving circuit;
   wherein the driving circuit generates the first and second driving voltages based on the PWM signal.

4. The backlight system of claim 3, further comprising:
   a first balance circuit coupled between the first end of the first winding of the first transformer and the first end of the first lamp;
   a second balance circuit coupled between the first end of the first winding of the second transformer and the second end of the first lamp; and
   a second lamp coupled between the first balance circuit and the second balance circuit.

5. The backlight system of claim 1, wherein the first transformer further comprises a third winding, the second transformer further comprises a third winding, and a first end of the third winding of the first transformer is coupled to a first end of the third winding of the second transformer.

6. The backlight system of claim 5, further comprising:
   a feedback circuit coupled between a second end of the third winding of the first transformer and a second end of the third winding of the second transformer for receiving a feedback current and generating a feedback signal based on the feedback current; and
   a pulse width modulation signal generator coupled between the feedback circuit and the driving circuit for receiving the feedback signal and generating a PWM signal based on the feedback signal, the PWM signal being furnished to the driving circuit;
   wherein the driving circuit generates the first and second driving voltages based on the PWM signal.

7. The backlight system of claim 6, further comprising:
a first balance circuit coupled between the first end of the first winding of the first transformer and the first end of the first lamp;
a second balance circuit coupled between the first end of the first winding of the second transformer and the second end of the first lamp; and
a second lamp coupled between the first balance circuit and the second balance circuit.

8. The backlight system of claim 1, wherein the first transformer further comprises a third winding, and the second transformer further comprises a third winding.

9. The backlight system of claim 8, further comprising:
a feedback circuit coupled to a first end and a second end of the third winding of the first transformer for receiving a first feedback current, further coupled to a first end and a second end of the third winding of the second transformer for receiving a second feedback current, and generating a first feedback signal and a second feedback signal based on the first feedback current and the second feedback current respectively; and
a pulse width modulation signal generator coupled between the feedback circuit and the driving circuit for receiving the first and second feedback signals and generating a first PWM signal and a second PWM signal based on the first and second feedback signals respectively, the first and second PWM signals being furnished to the driving circuit;
wherein the driving circuit generates the first and second driving voltages based on the first and second PWM signals respectively.

10. The backlight system of claim 9, further comprising:
a first balance circuit coupled between the first end of the first winding of the first transformer and the first end of the first lamp;
a second balance circuit coupled between the first end of the first winding of the second transformer and the second end of the first lamp; and
a second lamp coupled between the first balance circuit and the second balance circuit.

* * * * *